United States Patent Office 3,045,039
Patented July 17, 1962

---

3,045,039
ORGANOBORON COMPOUNDS AND METHODS OF MAKING SAME
George W. Willcockson and Joseph K. Sandie, Anaheim, Calif., assignors to United States Borax & Chemical Corporation, Los Angeles, Calif., a corporation of Nevada
No Drawing. Filed Sept. 14, 1959, Ser. No. 839,575
1 Claim. (Cl. 260—462)

The present invention is a continuation-in-part of our application bearing Serial Number 750,304 dated July 23, 1958, and now abandoned.

This invention relates as indicated to organoboron compounds and has more particular reference to beta unsubstituted vinylboronic acids, their esters and complex salts of the esters.

It is an object of this invention to provide new and useful beta unsubstituted vinylboronic acid monomers.

The present monomeric beta unsubstituted vinylboronic acids, their esters and complex salts of the esters will be found to have particular utility as sizing agents for paper and finishing agents for glass fibers. These materials will readily bond to the surface of the glass fibers and thus provide an excellent means for laminating the glass fibers to resins and additionally provide a surface for accepting dyes.

Additionally the present monomeric beta unsubstituted vinylboronic materials will readily undergo vinyl-type polymerization to form homopolymers and copolymers having a average molecular weight of at least 5,000. However, it is to be clearly understood that the present monomeric materials can yield polymers having average molecular weights of 10,000, 20,000 and higher. These polymers are readily produced using known and accepted polymerization techniques. The finished polymers can be made into films or they can be cast or extruded using the techniques and apparatus already in use with other vinyl-type materials.

Thus, a further object of this invention is to provide novel organoboron compounds which readily undergo vinyl-type polymerization or copolymerization to yield high molecular weight polymers.

A still further object is to use these new organoboron compounds in reactions such as Diels-Alder condensations, telomerizations and Michael-type additions to produce various products which have many new technical applications.

Other objects will appear as the description proceeds.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

Broadly stated, the present invention comprises beta unsubstituted vinylboron compounds having the general formula

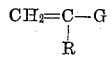

where R is selected from the group consisting of hydrogen and monovalent hydrocarbon radicals, G is a member of the group consisting of $B(OH)_2$, $B(OR')_3M$ and $B(OR')_2$, where R' is an alkyl radical of from 1–4 carbon atoms, and M is selected from the group consisting of MgCl, MgBr, Li, K and Na.

From the above broadly stated paragraph it will be seen that the present invention relates to new compositions of matter comprising beta unsubstituted vinylboronic acids, their esters and complex salts of the esters. So that there is no doubt as to the exact meaning of the expression "beta unsubstituted" vinylboronic acid, this term defines a vinylboron compound in which the beta carbon atom of the vinyl radical contains only hydrogen. This is of the utmost importance to the present invention since the beta unsubstituted vinylboronic compounds have polymerization characteristics not present in materials where the beta carbon atom is substituted with chlorine or other substituents.

These beta unsubstituted vinylboron compounds readily undergo vinyl-type polymerization to produce polymers having a molecular weight of at least 10,000 wherein the recurring structural unit is

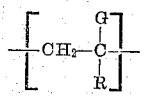

and wherein R represents a member of the group consisting of hydrogen, monovalent hydrocarbon radicals having from 1–5 carbon atoms and phenyl, G is a member of the group consisting of $B(OH)_2$, $B(OR')_3M$, and $B(OR')_2$ where R' is an alkyl radical of from 1–4 carbon atoms and M is selected from the group consisting of MgCl, MgBr, Li, K and Na.

The compounds of this invention have been successfully prepared by reaction of a boric acid ester with a vinyl-metallic compound having the general formula

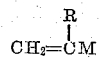

where R is a material selected from the group consisting of hydrogen, monovalent hydrocarbon radicals of from 1–5 carbon atoms and phenyl and M is selected from the group consisting of MgCl, MgBr, Li, K and Na.

So that the present invention is more clearly understood, the following examples are given for the purpose of illustration but are not intended to limit this invention.

(I)

A one liter three-necked flask, containing 24.3 grams of magnesium turnings, was equipped with a mechanical stirrer, a large Dry Ice condenser, and a 500-ml. addition funnel fitted with a gas addition adapter and a Dry Ice condenser. The apparatus was purged with dry nitrogen and flame dried. Commercial grade tetrahydrofuran, 250 ml., was added to the addition funnel and 75 grams of vinyl chloride was added to the tetrahydrofuran by means of a subsurface fritted glass tube. Approximately 10 ml. of this solution was added to the stirred magnesium turnings. The flask was heated, while adding additional tetrahydrofuran, to about 45° C.; at this point the reaction was initiated with the addition of one ml. of ethyl bromide. The balance of the vinyl chloride-tetrahydrofuran mixture was added slowly in a temperature range of 48–52° C. This temperature range was maintained for about three hours to insure complete reaction.

A two liter three-necked flask was equipped with a mechanical stirrer and 500-ml. and one liter addition funnels. The drip tips of the funnels extended to the middle of the flask. Tetrahydrofuran, 300 ml., was added to the flask and the foregoing Grignard reagent was decanted under nitrogen into the one liter addition funnel. Redistilled trimethyl borate (104 grams) was added to the 500-ml. addition funnel. While cooling the flask with a Dry Ice-acetone bath, the two reagents were slowly added in about a 1:1 molar ratio over a 60-minute period. The reaction mixture was then allowed to stand about 12 hours with stirring. The resultant white precipitate was filtered and dried at aspirator pressure. On analysis this material proved to be chloromagnesium vinyltrimethoxyborate [$CH_2$=$CHB(OCH_3)_3$]MgCl.

The [$CH_2$=$CHB(OCH_3)_3$]MgCl was dissolved in cold water, acidified (Congo Red indicator) with five percent hydrochloric acid and extracted with ether while maintaining a nitrogen atmosphere at all times. The ether was distilled under reduced pressure and the resultant material was a crystalline solid which decolorized bromine in chloroform. Recrystallization in benzene yielded colorless crystalline plates.

Infrared and elemental analysis indicated the product to be monomeric ethyleneboronic acid.

(II)

Isopropenyllithium was prepared by slowly adding 30.2 grams of 2-bromopropene with stirring to 4.3 grams of lithium metal in 450 ml. of anhydrous ether.

Anhydrous ether, 200 ml., was added to a two liter three-necked flask equipped with a mechanical stirrer and one liter and 500 ml. addition funnels with drip tips extending to the middle of the flask. The one liter and 500-ml. addition funnels were charged with isopropenyllithium and 47 grams of redistilled isopropyl borate, respectively. The flask was cooled in a Dry Ice-acetone bath and the two reactants were added simultaneously at a 1:1 molar ratio over a period of 90 minutes. The reaction mixture was stirred for an additional four hours while in the cooling bath and then allowed to warm up to room temperature and left to stand for about 12 hours.

The ether was decanted from the precipitate and the solid was dried at aspirator pressure. A petroleum ether wash and subsequent drying at reduced pressure yielded a powdery white solid. The white solid on analysis proved to be $$CH_2=C-B(OPr^i)_3Li$$
$$\phantom{CH_2=}|\phantom{-B(OPr^i)_3Li}$$
$$\phantom{CH_2=}CH_3$$

This material was treated with cold water and the hydrolysis mixture was filtered. The filtrate was acidified and extracted with ether. Upon evaporation of the ether a white crystalline solid remained. Sublimation yielded pure isopropeneboronic acid. This material decolorized bromine in chloroform.

Infrared and elemental analysis indicated the product to be monomeric isopropeneboronic acid.

(III)

Chloromagnesium trimethoxyvinylborate (50 grams), redistilled benzoyl chloride (35 grams) and 300 ml. of redistilled diglyme were placed in a 500-ml. flask which was fitted with a reflux condenser. The mixture was stirred and warmed to 60–70° C. at aspirator pressure. A colorless liquid product was volatilized and condensed in a Dry Ice-acetone trap. Distillation of this condensate from N,N'-diphenyl-p-phenylenediamine yielded dimethyl ethyleneboronate. This product has a boiling point of 74–78° C., a boron content of 10.80% (theoretical 10.85% B) and decolorized bromine in chloroform.

In other experiments dimethyl ethyleneboronate was produced from the vinyltrimethoxyborate by treatment with either $BCl_3$ or anhydrous HCl in place of the benzoyl chloride.

In the absence of inhibitors, the dimethyl ethyleneboronate polymerized quite readily at or below room temperature to give a transparent polymer. This polymer did not decolorize bromine and its infrared and elemental analysis was consistent with the structure

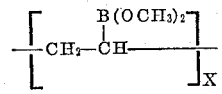

The foregoing example describes the production of an ester by the removal of metal methoxide from chloromagnesium trimethoxyvinylborate. As previously stated, this is accomplished by the use of benzoyl chloride, $BCl_3$ and anhydrous HCl; however, any anhydrous acid or material having an active halogen is capable of producing the ester from the complex salt. The only important factor is that the reaction must be carried out in a nonaqueous system.

It will also be noted thaat the dimethoxyboryl group of the above polyethyleneboronate can by hydrolysis, transesterification or reaction with a metal methoxide be converted to a polymeric material wherein the dimethoxyboryl group has been changed to a dihydroxyboryl, a different dialkoxyboryl or a metal trimethoxyboryl group.

The foregoing examples demonstrate that chloromagnesium trimethoxyvinylborate, lithium triisopropoxyisopropenylborate, dimethyl ethyleneboronate and ethylene- and isopropeneboronic acids can be synthesized from a boric acid ester and a vinyl- or isopropenylmetallic reagent. However, it will be clearly understood that by substituting other alpha substituted vinyl radicals the corresponding complex salts and boronic acids can be produced. Thus the alpha carbon atom of the vinyl radical can be substituted with any monovalent hydrocarbon having from 1–5 carbon atoms or phenyl and it is the full intention of the present invention to provide such compounds as beta unsubstituted 2-but-1-eneboronic acid, beta unsubstituted 2-pent-1-eneboronic acid and beta unsubstituted alpha styreneboronic acid. Additionally it is to be understood other ratios of the reactants described may be used.

Thus this invention provides a novel process for obtaining vinylalkoxyborates which can be readily converted to the boronic acids. Such derivatives have many applications in the fields of polymers and intermediates for general synthesis.

Other modes of applying the principle of the invention may be employed, change being made as regards the details described, provided the features stated in the following claim or the equivalent of such be employed.

We, therefore, particularly point out and distinctly claim as our invention:

The method for preparing vinylboron compounds having a terminal methylene group which comprises the reaction, in a non-aqueous system, of a complex salt having the formula

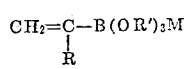

with a material selected from the group consisting of anhydrous acids and anhydrous materials having active halogens, where R is selected from the group consisting of hydrogen, monovalent hydrocarbon radicals of from 1 to 5 carbon atoms and phenyl, R' is an alkyl radical of from 1–4 carbon atoms and M is selected from the group consisting of MgCl, MgBr, Li, K and Na.

References Cited in the file of this patent
UNITED STATES PATENTS 2,884,441    Groszos    Apr. 28, 1959
2,921,954    Ramsden    Jan. 19, 1960

OTHER REFERENCES

Coates: Organo Metallic Compounds, Wiley, 1956, pages 3, 5, 70 and 71.

Lappert: Chemical Reviews, vol. 56, pages 983–999 (1956).

Letsinger et al.: Journal of Organic Chemistry, vol. 18, pages 895–897 (1953).